3,165,411
PHOTOGRAPHIC PRODUCTS
Charles J. Fox, Rochester, N.Y., assignor to Eastman Kodak Company, Rochester, N.Y., a corporation of New Jersey
No Drawing. Filed May 4, 1959, Ser. No. 810,574
5 Claims. (Cl. 96—114)

This application relates to coating compositions comprising a dispersion in water of a polymer of a 1,3-diolefin and an unsaturated acid.

Various polymers have been suggested as useful in aqueous coating compositions, particularly polymers containing carboxyl groups. For instance, the art has referred to the use of copolymers of ethyl acrylate and acrylic acid for this purpose. Although polymers of this type, the salts of which are water soluble can be prepared, the coatings resulting therefrom have often exhibited tackiness and blocking, particularly at high relative humidities. The polymers of diolefins and unsaturated acids which have been described in the prior art have been insoluble or only partly soluble in water and the polymers have had a low carboxyl content. None of the previous polymers of this nature have been useful for aqueous coating compositions.

One object of my invention is to provide polymers whose salts exhibit good solubility in water and which are free of cross linking while in solution. Another object of my invention is to provide polymers from which coating compositions may be prepared which give clear, tough, flexible films free of blocking and tackiness. Other objects of my invention will appear herein.

I have found that by preparing by emulsion polymerization copolymers and terpolymers of 1,3-diolefins with unsaturated acids so that approximately one unit of residual unsaturation is present in the polymer for every diolefin unit therein and sufficient unsaturated acid is used in the initial monomer feed, that the ammonium salts of the product resulting are soluble in water at a convenient pH and cross linking in the polymerization procedure is avoided. I have found that copolymers and terpolymers of this nature are compatible with gelatin and may be employed as extenders therefor. These copolymers and terpolymers are also useful as pigment binders or as deflocculating agents for blanc fixe paste. 1,3-olefins useful in preparing polymers for my invention are butadiene, isoprene and 2,3-dimethyl-1,3-butadiene. Unsaturated acids useful in the preparation of polymers for my invention are acrylic acid, methacrylic acid, crotonic acid, α-chloroacrylic acid, α-cyanoacrylic acid and α-trifluoromethyl acrylic acid.

Terpolymers for use in my invention may be prepared either by using 3 of the monomers listed or by replacing some of the butadiene or other diolefin with 2,2,2-trifluoroethyl acrylate. In the preparation of terpolymers using the trifluoroethyl acrylate it is recommended that the proportions be kept within the range of 31 parts of trifluoroethyl acrylate—34.5 parts of diolefine and unsaturated acid to 47.4 parts of the former—26.3 parts of diolefin and unsaturated acid, the olefin and trifluoroethyl acrylate constituting at least 50 mole percent and the unsaturated acid at least 20 mole percent of the monomer mixture.

I have found that by polymerizing 1,3-diolefins and $\alpha,\beta$-unsaturated acids, in an emulsion polymerization at a temperature of 35–55° C. a polymer is obtained having residual unsaturation therein which does not result in cross linking during the polymerization, but after applying as a coating to a surface and drying, cross linking of the polymer is obtained. Thus, the resulting coating is resistant to immersion in weak alkaline solution although susceptible to swelling therein, the latter property making these coatings particularly desirable for photographic elements.

I have found that it is generally desirable that the polymers of my invention be made using a diolefin-unsaturated acid mixture containing at least 20 mole percent of unsaturated acid and preferably at least 26 mole percent of unsaturated acid to obtain the best results. The diolefins should constitute at least 50 mole percent of the monomer mixture from which the polymer is prepared. The criterion of the amount of unsaturated acid to use is that it is present in sufficient amount to assure solubility of the ammonium or alkali metal salts of the polymer in water. I have found that the employment of a sufficient amount of unsaturated acid to provide water solubility of the salt of the polymer also acts to eliminate tackiness in the coating which is applied. For instance, a copolymer composition of butadiene and acrylic acid in which the initial monomer feed contains at least 26 mole percent of acrylic acid will result in a polymer whose ammonium salts are soluble in water at a pH of at least 7. Upon coating out the solution and evaporating to dryness clear, tough coatings free of tackiness are obtained.

When the acrylic acid amount is increased to 38 mole percent, the ammonium salt of the polymer is soluble in water at a pH of 6.5–7.0. In the case of copolymers of butadiene and methacrylic acid 22 mole percent of methacrylic acid is sufficient to give a product whose ammonium salts are soluble in water at a pH above 7.0 and good coatings are obtained therefrom.

In the case of the terpolymers of butadiene, acrylic acid and methacrylic acid the ammonium salts thereof are appreciably soluble in water both at a pH of 7 or more and at a pH of less than 7, such as of 6.5–7. If a 1.9–6.2 mole percent of methacrylic acid is used, at least 32 mole percent of acrylic acid insures appreciable solubility below pH 7 as well as above pH 7 (the remainder essentially consisting of diolefine).

Solubility of the ammonium salts of the polymers may vary according to the molecular weight of the polymer. If a polymer of increased solubility is desired a lower molecular weight product may be obtained by increasing the catalyst concentration or by using a modifier such as dodecyl mercaptan in the preparation of the polymer.

The following examples illustrate the preparation of polymers having an average of approximately 1 unit of residual unsaturation for every diolefin unit therein and which have sufficient carboxyl groups to assure solubility of the salts thereof in water.

Example 1

A solution was prepared of 18 grams of acrylic acid (38 mole percent), 0.12 gram of dodecylmercaptan, 0.15 gram of potassium persulfate and 1.0 gram of the sodium salt of oleyl methyl taurine in 110 ml. of water. The solution was chilled and 12.4 grams of liquid butadiene was added thereto. After the butadiene had displaced the air in the container in which the solution had been placed, it was sealed with a neoprene-lined cap. The mass was mixed and heated by a 50° C. water bath for 15 hours. The pressure in the bottle dropped from 65 p.s.i.g. to 0 p.s.i.g. during this period. The product was a polymer which was stable in the emulsion resulting. When coated onto a surface and the water evaporated therefrom, clear, flexible, non-tacky films were obtained. The emulsion or latex obtained was diluted to 7% solid content with water and then normal ammonium hydroxide was added with stirring. A highly viscous solution was obtained at pH 6.5–7.0. The resulting solution when coated onto a surface formed clear, flexible, non-tacky films. With adjustment of the pH to 7.0–8.0, the solution increased in viscosity and further raising of the pH produced a gel-like appearance.

Example 2

Other polymerizations were carried out as described in the preceding example using 26-33 mole percent of acrylic acid. After 15 hours the pressure was 0 p.s.i.g. The latex obtained was found to have a solids content of 22-33% which indicated a yield of polymer of 94-96 percent based on 100 percent conversion of butadiene. The latex was diluted with water to 7% solids content and then normal ammonium hydroxide was added with stirring. The solution became viscous at a pH of 7.0-8.0. Coatings obtained upon application to a film forming surface and evaporating the water were clear, flexible and nontacky.

Example 3

The polymerization described in Example 1 was repeated except 44 grams methacrylic acid (56 mole percent) was used instead of acrylic acid. The latex formed had a solids content of 40% indicating a yield of polymer of about 100%. The emulsion was diluted to 7% solids content and dilute ammonium hydroxide was added. A pH of 9.0 was required to completely neutralize the acid in the polymer. Coatings of the solution obtained upon evaporation of the water therefrom were clear, nontacky and somewhat flexible.

Example 4

A polymerization was carried out as described in Example 1 using 10 grams (22 mole percent) of methacrylic acid instead of acrylic acid. After 15 hours the pressure in the bottle was 0. Dilution of the latex thus formed to 7% solids followed by addition of dilute ammonia resulted in appreciable viscosity at a pH above 7.0. Coatings therefrom after evaporation of water were found to be clear, flexible and non-tacky.

Example 5

The polymerization described in Example 1 was repeated except that 1 gram of methacrylic acid (1.9 mole percent) and 16 grams of acrylic acid (35 mole percent) was used. After 15 hours the pressure in the bottle was 0. The latex formed was diluted to 7% solids content and ammonium hydroxide was added which resulted in increasing the viscosity of the solution at a pH of 6.5-7.0. Coatings of the latex were clear, flexible and nontacky.

Example 6

A polymerization like that in Example 1 except using 1 gram of methacrylic acid (1.9 mole percent) and 14 grams of acrylic acid (32 mole percent) was used. After 15 hours the pressure in the bottle was 0. The latex formed was diluted to 7% solids and normal ammonium hydroxide was added resulting in appreciable viscosity of the solution at a pH of 7.2. Coatings of this latex were clear, flexible and nontacky.

Example 7

The polymerization as carried out in Example 1 was repeated except that 2 grams of methacrylic acid (2.3 mole percent) and 14 grams of acrylic acid (32 mole percent) was used. After 15 hours the pressure in the bottle was 0. Dilution of the latex to 7% solids and addition of normal ammonium hydroxide resulted in appreciable viscosity of the solution at a pH of 6.5-6.9. Further addition of alkali resulted in gel-like consistency. However, the addition of about 2% ethanol to the resulting gel reduced the viscosity sufficiently to permit coating. Coatings of the resulting latex were clear, flexible and non-tacky.

Example 8

A latex was prepared as described in Example 1 by using 10.5 grams of butadiene and 6.0 grams of α-chloroacrylic acid (22 mole percent) and 0.1 gram dodecyl-mercaptan, 0.05 gram potassium persulfate and 0.5 gram of oleyl methyl taurine in 110 ml. of water, mixing at 50° C. After 7 hours the pressure was dropped from 65 p.s.i.g. to 45 p.s.i.g. and after 23 hours the pressure was 5 p.s.i.g. Two grams of butadiene were lost on opening the bottle. After dilution of the emulsion to 7% solids and neutralization with ammonium hydroxide the latex showed appreciable viscosity at pH 5.0-6.0. No appreciable increase in viscosity was observed at pH 6.0-9.0. The solutions appeared quite stable with no evidence of cross linking. Coatings obtained from the latex were non-tacky and flexible.

Example 9

A latex was prepared was described in Example 1 using 3.5 grams (6.2 mole percent) of methacrylic acid and 16 grams (32 mole percent) of acrylic acid instead of the 18 grams of acrylic acid used in Example 1. After heating for 15 hours in the water bath the pressure in the bottle dropped to 0 p.s.i.g., and no loss of weight resulted from the opening of the bottle. The emulsion was diluted to 7% solids content with water followed by the addition of normal ammonium hydroxide which neutralized the polymer, and the resulting solution showed appreciable viscosity at pH 6.5-7.0. Coatings were made from the resulting solution, which upon evaporation of water therefrom, were clear, flexible and non-tacky.

The following examples illustrate the use of the copolymers described above as the binder in a baryta coating composition applied to photographic paper base.

Example 10

Twenty grams of a 9.8% aqueous solution of a copolymer prepared from 65 weight percent of butadiene and 35 weight percent of a methacrylic acid at pH 8.5 as the ammonium salt was mixed with 50 grams blanc fixe containing 40% solids and .06 gram of a bisepoxide hardener. The resulting solution was coated on a gelatin-sized photographic paper base having a 27 lb. base weight. The coating was dried overnight at room temperature. It was found to adhere tightly to the paper and was smooth and non-tacky. It was found that a gelatin silver halide emulsion layer when coated over the baryta layer thus applied exhibited good adherence upon formation of photographic paper.

Example 11

Fifty-five grams of 40% blanc fixe was mixed with .62 gram of gelatin in 10% aqueous solution and the mass was stirred to a smooth paste. 30 grams of a 10% aqueous solution of the ammonium salt of butadiene-methacrylic acid copolymer at pH 9 was added. The mixture became fluid and was readily coated onto gelatin sized photographic paper base of 27 lb. base weight. The baryta layer was dried. It was found to adhere tightly to the paper and did not peel off on folding.

Example 12

Fifty-five grams of 40% blanc fixe was mixed with .62 gram of gelatin in a 10% aqueous solution and the mass was stirred to form a thick paste. A solution of 25 grams of a 10% aqueous solution of the ammonium salt at a pH of 9 of a copolymer resulting from the polymerization of 75 weight percent of butadiene and 25 weight percent of methacrylic acid was added. The resulting fluid mixture was coated on gelatin-sized paper base, 27 lb. base weight. The coating was smooth, adhered very tightly to the paper and did not peel on coating. The thus obtained baryta layer was receptive to a gelatin-silver halide photographic emulsion layer to form photographic paper of good characteristics.

Example 13

Ten parts of a 10% aqueous solution of ammonium salt, at pH 9, of a copolymer prepared from 65 weight percent butadiene and 35 weight percent of methacrylic acid was added to a thick paste mixture composed of 55 parts of blanc fixe, 40% solids, 6.2 parts of a 10% aqueous solution of gelatin and 3.7 parts of styrene-butadiene latex, 50% solids. Upon this addition the paste became fluid and could be easily poured. A coating thereof was applied to gel-sized photographic paper, 27 pound base weight. The coating was dried and it was found that it adhered tightly to the paper and did not crack or peel upon folding. Immersion of the dry coating in water for 15 minutes or in dilute ammonium hydroxide for 30 minutes followed by vigorous rubbing between the thumb and forefinger did not cause any redispersion of the baryta or any removal thereof from the paper.

*Example 14*

Ten parts of a 10% aqueous solution of ammonium salt, at pH 9, of a copolymer prepared from 75 weight percent butadiene and 25 weight percent of methacrylic acid was added to a thick paste mixture composed of 55 parts of blanc fixe, 40% solids, 6.2 parts of a 10% aqueous solution of gelatin and 3.7 parts of styrene-butadiene latex, 50% solids. The paste became fluid and was coated onto gel-sized photographic paper of 27 pound base weight. The baryta layer was dried and was found to adhere tightly to the paper and did not crack or peel upon folding. Immersion of the paper in water for 15 minutes or in dilute ammonium hydroxide for 30 minutes followed by vigorous rubbing between the thumb and forefinger did not cause any redispersion of the baryta or any removal thereof.

Polymers prepared as described but including 2,2,2-trifluoroethyl acrylate formed latices which upon coating gave layers which were flexible, tough and non-tacky. These latices are useful for supplying photographic coatings, as carriers for pigments and as gelatin extenders in compositions adapted for preparing photographic products. The following examples illustrate methods of preparing latices useful for the purposes described herein.

*Example 15*

To a solution containing 10 parts (0.115 mole) of methacrylic acid and 1 part of the sodium salt of oleyl methyl taurine in 100 parts of water, 9 parts (0.058 mole) of 2,2,2-trifluorethyl acrylate and 0.24 part of dodecylmercaptan were added. The resulting mixture in a glass bottle was chilled with an ice-methanol bath and 15 parts of potassium persulfate in 10 parts of water and 10 parts (0.2 mole) of butadiene were added. After the air in the bottle was displaced by butadiene it was sealed with a neoprene cap. The emulsion was mixed by rotating the bottle end over end in a 50° C. water bath for 15 hours. At the end of this period the pressure in the bottle had dropped to zero and the emulsion obtained was stable upon standing. The emulsion was neutralized with normal ammonium hydroxide giving a viscosity of 850 cps. at a pH of 7.4. The solution had a 5% solids content. A coating prepared from the latex thus obtained was clear, flexible and non-tacky.

*Example 16*

A polymerization was carried out as described in the preceding example except that 18 parts of 2,2,2-trifluoroethyl acrylate was used instead of 9 parts. Neutralization of the emulsion with ammonium hydroxide stabilized and increased the viscosity of the latex to 620 cps. at pH 7.6. The solution had a solids content of 7.5%. Coatings prepared therefrom were clear, flexible, tough and non-tacky.

*Example 17*

Polymerization was carried out as described in Example 15 except that 5 parts rather than 10 parts of methacrylic acid was used. Neutralization of the resulting emulsions with ammonium hydroxide resulted in a slight increase in viscosity, 25 cps. at pH 8.3. The solids content of the solution was 6.3%. A coating prepared from this emulsion was rubbery and tended to be tacky.

The latices described above are adapted as carriers for various types of pigments which includes silver halide dispersions so as to form photographic emulsions. This is illustrated by the following example.

*Example 18*

A latex comprising 27% solids was prepared using as the monomers butadiene and methacryic acid, as described above, the methacrylic acid having been used in an amount of 35 mole percent. The pH thereof was adjusted to 5 with normal ammonium hydroxide. Sufficient of the latex to supply 2.7 parts of polymer was mixed with 0.5 parts of tetrasodium-N-(dicarboxyethyl)-N-octadecyl sulfosuccinamate. The mixture was mixed with a negative type photographic emulsion containing silver halide made according to the procedures of U.S. 2,618,556. The composition of the silver halide emulsion composition was 2.7 parts of polymer (in latex form, 27% solids), 2.7 parts of silver halide, 11 parts of water, 0.5 part of surface active agent. The emulsion mixture obtained was stable. It was coated by means of a doctor blade on gelatin subbed cellulose acetate film base at a thickness of 0.006 inch which was fumed with ammonia for 10 seconds. The setting of coatings of this nature by fuming with ammonia is not my invention but is the invention of William J. Priest and Joseph Yudelson. At the end of this time it had gelled and could be dried in a current of warm dry air.

In the preparation of dispersions for use in supplying coatings in the manufacture of photographic products in accordance with my invention, it has been found that the use of acrylic acid as the unsaturated acid is conductive to the preparation of products exhibiting solubilities at a pH not only above 7 but at 7 and below 7. Solutions of these polymers, however, are more susceptible to some cross-linking occurring therein than in those polymers in which some methacrylic acid has been employed in their preparation, the methacrylic acid ordinarily having a stabilizing effect on the solutions of the polymers prepared. This, however, is not always the case as in some cases, polymers are prepared by emulsion polymerization using acrylic acid as the only unsaturated acid, and good stability is exhibited. The preferred proportions of constituents in preparing latices for use in accordance with my invention are 1.9–6.2 mole percent of methacrylic acid, 35–32 mole percent respectively of acrylic acid and the remainder of the constituents entering into the polymerization essentially consisting of diolefin or a mixture of diolefin and trifluoroethyl acrylate in the latices which I have prepared. It appears, in general, that those having proportions of methacrylic acid and acrylic acid within the ranges given exhibit the best solubilities at pH below 7, coupled with stability thereof to cross-linking effects.

I claim:

1. A gelatin-silver halide photographic emulsion essentially consisting of silver halide grains suspended in an aqueous solution of a salt selected from the group consisting of the ammonium and alkali metal salts of the polymers obtained by polymerization of at least 15 hours duration of a mixture essentially consisting of 50–80 mol percent of 1,3-diolefin and 50–20 mol percent of unsaturated carboxylic acid.

2. A gelatin-silver halide photographic emulsion essentially consisting of silver halide grains suspended in an aqueous solution of ammonium salt of butadiene and methacrylic acid polymer prepared by polymerization of at least 15 hours duration of a mixture of 65 weight percent of butadiene and 35 weight percent of methacrylic acid.

3. A gelatin-silver halide photographic emulsion essentially consisting of silver halide grains suspended in an aqueous solution of the ammonium salt of a polymer obtained by polymerization of at least 15 hours duration of a mixture of butadiene, methacrylic acid and acrylic acid, the methacrylic acid constituting 1.9–6.2 mol percent, the acrylic acid 35–32 mol percent and the remainder consisting essentially of butadiene.

4. A photographic product comprising a support having thereon a layer of a gelatin-silver halide photographic emulsion essentially consisting of silver halide grains in a vehicle composed of a water soluble salt of a polymer essentially consisting of 50–80 mol percent of 1,3-diolefin and 50–20 mol percent of unsaturated carboxylic acid.

5. A process of preparing photographic paper which comprises applying to photographic paper base a suspension of barium sulfate in an aqueous solution of an ammonium salt of a polymer obtained by polymerization of at least 15 hours duration of a mixture essentially consisting of 50–80 mol percent of unsaturated material selected from the group consisting of 1,3-butadiene compound and the mixture of 1,3-butadiene compound and 2,2,2-trifluorethyl acrylate and 50–20 mol percent of unsaturated carboxylic acid and then applying over the baryta coating a silver halide photographic emulsion layer.

References Cited in the file of this patent

UNITED STATES PATENTS

| | | |
|---|---|---|
| 2,604,668 | Miller et al. | Apr. 12, 1949 |
| 2,774,703 | Reynolds | Dec. 18, 1956 |
| 2,787,545 | Gates et al. | Apr. 2, 1957 |
| 2,831,676 | Dann et al. | Apr. 22, 1958 |
| 2,859,201 | Uraneck et al. | Nov. 4, 1958 |
| 2,865,753 | Griffin et al. | Dec. 23, 1958 |
| 2,880,189 | Miller et al. | Mar. 31, 1959 |
| 2,894,857 | Uraneck et al. | July 14, 1959 |
| 2,897,168 | Brown | July 28, 1959 |
| 2,930,775 | Fordyce et al. | Mar. 29, 1960 |
| 2,952,565 | Contois et al. | Sept. 13, 1960 |
| 2,957,767 | Williams | Oct. 25, 1960 |
| 2,973,285 | Berke et al. | Feb. 28, 1961 |
| 3,070,583 | Uraneck et al. | Dec. 25, 1962 |

FOREIGN PATENTS

| | | |
|---|---|---|
| 692,105 | Great Britain | May 27, 1953 |